United States Patent
Gao et al.

(10) Patent No.: US 12,114,341 B2
(45) Date of Patent: Oct. 8, 2024

(54) WIRELESS COMMUNICATION METHOD FOR DETERMINING SPATIAL RELATION AND POWER CONTROL PARAMETER FOR UPLINK SIGNALS

(71) Applicant: ZTE CORPORATION, Guangdong (CN)

(72) Inventors: Bo Gao, Shenzhen (CN); Zhaohua Lu, Shenzhen (CN); Yu Ngok Li, Shenzhen (CN); Ke Yao, Shenzhen (CN); Shujuan Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 235 days.

(21) Appl. No.: 17/738,883

(22) Filed: May 6, 2022

(65) Prior Publication Data

US 2023/0028119 A1 Jan. 26, 2023

Related U.S. Application Data

(63) Continuation of application No. PCT/CN2019/116385, filed on Nov. 7, 2019.

(51) Int. Cl.
*H04W 72/54* (2023.01)
*H04L 5/00* (2006.01)
*H04W 72/1268* (2023.01)

(52) U.S. Cl.
CPC .......... *H04W 72/54* (2023.01); *H04L 5/0051* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 2019/0254023 A1* | 8/2019 | Qin | H04W 72/21 |
| 2019/0254120 A1 | 8/2019 | Zhang et al. | |
| 2020/0100186 A1* | 3/2020 | Osawa | H04W 52/367 |
| 2021/0076387 A1* | 3/2021 | Papasakellariou | H04L 5/14 |
| 2021/0410076 A1* | 12/2021 | Ryu | H04W 52/325 |

FOREIGN PATENT DOCUMENTS

| | | |
|---|---|---|
| CN | 107734624 A | 2/2018 |
| CN | 108886751 A | 11/2018 |

(Continued)

OTHER PUBLICATIONS

Catt, "Remaining issues on beam management enhancements in Rel. 16", 3GPP TSG RAN WG1 #98bis, R1-1910350, Oct. 20, 2019, Chongqing, China (9 pages).

(Continued)

*Primary Examiner* — Phirin Sam
(74) *Attorney, Agent, or Firm* — Foley & Lardner LLP

(57) ABSTRACT

Method, systems and devices for determining spatial relation and power control parameter for uplink signals. The method for use in a wireless terminal comprises determining at least one of at least one power control parameter or spatial relation for a first uplink signal on a first component carrier, and transmitting, to a wireless network node, the first uplink signal on the first component carrier based on at least one of determined at least one power control parameter or determined spatial relation.

4 Claims, 4 Drawing Sheets

(56) References Cited

FOREIGN PATENT DOCUMENTS

CN      109803362 A    5/2019
WO  WO-2019/197044 A1  10/2019

OTHER PUBLICATIONS

Extended European Search Report for EP Appl. No. 19951701.2, dated Jul. 7, 2023 (13 pages).
ZTE, "Enhancements on multi-beam operation", 3GPP TSG RAN WG1 Meeting #98bis, R1-1910285, Oct. 20, 2019, Chongqing, China (24 pages).
International Search Report and Written Opinion for PCT Appl. No. PCT/CN2019/116385, mailed Jul. 29, 2020 (6 pages).
Oppo, "Discussion on Multi-beam Operation Enhancements" 3GPP TSG RAN WG1 #98bis, R1-1910117, Oct. 20, 2019, Chongqing, China (11 pages).
Qualcomm Incorporated., "Enhancements on Multi-beam Operation" 3GPP TSG-RAN WG1 Meeting #98, R1-1911127, Oct. 20, 2019, Chongqing, China (22 pages).
Vivo, "Discussion on remaining issues on multi beam enhancement" 3GPP TSG RAN WG1 #98bis, R1-1910230, Oct. 20, 2019, Chongqing, China (9 pages).
LG Electronics, "Feature lead summary#4 of Enhancements on Multi-beam Operations", 3GPP TSG RAN WG1, Meeting #98bis, R1-1911561, Oct. 20, 2019, Chongqing, China (17 pages).
Notice of Grounds of Rejection on JP Appl. Ser. No. 2022-526502 dated Aug. 16, 2023 (with English translation, 8 pages).

\* cited by examiner

WIRELESS COMMUNICATION METHOD FOR DETERMINING SPATIAL RELATION AND POWER CONTROL PARAMETER FOR UPLINK SIGNALS

CROSS-REFERENCE TO RELATED APPLICATION

This application claims the benefit of priority under 35 U.S.C. § 120 as a continuation of PCT Patent Application No. PCT/CN2019/116385, filed on Nov. 7, 2019, the disclosure of which is incorporated herein by reference in its entirety.

TECHNICAL FIELD

This document is directed generally to wireless communications, and more particularly to a wireless communication method for determining spatial relation and power control parameter for uplink signals.

BACKGROUND

As the expense of wide or ultra-wide spectrum resources, the considerable propagation loss induced by an extremely high frequency becomes a noticeable challenge. To solve this issue, an antenna array and beam-forming (BF) training technologies using massive multiple-input-multiple-output (MIMO), e.g., up to 1024 antenna elements for one node, have been adopted to achieve the beam alignment and obtain a sufficiently high antenna gain. In addition, in order to keep low implementation cost while still benefit from the antenna array, analog phase shifters become very attractive for implementing the mmWave beam-forming. When adopting the analog phase shifters, the number of controllable phases becomes finite and the constant modulus constraints are placed on these antenna elements. Given the pre-specified beam patterns, the variable-phase-shift-based BF training targets to identify the best pattern for subsequent data transmission generally. FIG. 1 shows a schematic diagram of a case with one transmission-reception point (TRP) and one user equipment (UE). In FIG. 1, the beams covered by full black color are selected for transmissions based on uplink/downlink transmissions.

SUMMARY

In 5G new radio (NR), the analog beam-forming is firstly introduced into mobile communication for guaranteeing the robustness of high frequency communications. The corresponding analog beam-forming indication (also called as beam indication) involves both downlink (DL) and uplink (UL) transmissions. For the UL transmissions, spatial relation information which is configured by a new higher layer parameter spatialRelationInfo has been introduced for supporting beam indication for a UL control channel, i.e., physical uplink control channel (PUCCH), and a sounding reference signal (SRS). Besides, beam indications for a UL data channel, i.e., physical uplink shared channel (PUSCH), is achieved through mapping between one or more SRS resources, which are indicated by a NR base station (i.e. gNB), and antenna ports of the UL data channel. That is, the beam configuration for UL data channel can be derived from the spatial relation information association/mapping information between the SRS resources and antenna ports accordingly. However, introducing the new high layer parameter for supporting the beam indication may increase the overhead of the higher layer parameters.

This document relates to methods, systems, and devices for determining spatial relation and power control parameter for uplink signals.

The present disclosure relates to a wireless communication for use in a wireless terminal. The wireless communication method comprises:

determining at least one of at least one power control parameter or spatial relation for a first uplink signal on a first component carrier, and transmitting, to a wireless network node, the first uplink signal on the first component carrier based on at least one of determined at least one power control parameter or determined spatial relation.

Various embodiments may preferably implement the following features:

Preferably, when a transmission configuration indicator, TCI, state has a plurality of reference signal, RS, indexes, an RS index associated with a Quasi co-location, QCL, Type of a spatial parameter is used for determining at least one of the at least one power control parameter or the spatial relation of the first uplink signal.

Preferably, the at least one power control parameter comprises a path-loss RS, the first uplink signal comprises at least one physical uplink control channel, PUCCH, and the wireless terminal receives a medium access control, MAC, control element, CE, for updating a path-loss RS of the at least one PUCCH.

Preferably, the spatial relation is determined based on at least one transmission parameter associated with a downlink signal on the first component carrier.

Preferably, the first uplink signal comprises at least one of a sounding reference signal, SRS, a physical uplink shared channel, PUSCH, or a PUCCH.

Preferably, the at least one transmission parameter comprises at least one of a spatial domain filter, a transmission configuration indicator, TCI, state or a Quasi co-location, QCL, assumption.

Preferably, when the first component carrier is configured with at least one control resource set, CORESET, the spatial relation of the first uplink signal is determined based on the at least one transmission parameter of a CORESET with the lowest index within the at least one CORESET.

Preferably, the CORESET with the lowest index and the first uplink signal are associated with the same CORESET pool index or the same CORESET group.

Preferably, when the first component carrier is not configured with a CORESET, the spatial relation of the first uplink signal is determined based on a TCI state with the lowest index within at least one TCI state activated for the downlink signal.

Preferably, when the at least one TCI state for the downlink signal is not configured or activated, the spatial relation of the first uplink signal is determined based on the at least one transmission parameter of a CORESET or a PDCCH, and the CORESET or the PDCCH schedules the first uplink signal.

Preferably, the first uplink signal comprises at least one physical uplink control channel, PUCCH, and the at least one power control parameter comprises at least one of a target power, a closed loop index or a path-loss reference signal, RS, of the at least one PUCCH.

Preferably, the target power of the at least one PUCCH is determined by an entry having one of a specific index, the highest index or the lowest index in a target power set.

Preferably, the closed loop index of the at least one PUCCH is one of a specific index, the highest index or the lowest index within a range of the closed loop index.

Preferably, the closed loop index of the at least one PUCCH is determined based on a TCI state applied to a CORESET with the lowest index within at least one CORESET or a TCI state with the lowest index within at least one TCI state activated for a downlink signal on the first component carrier.

Preferably, when the first component carrier is configured with at least one CORESET, the path-loss RS of the at least one PUCCH is determined based on an RS of a TCI state applied for a CORESET with the lowest index within the at least one CORESET or a QCL assumption for the CORESET with the lowest index within the at least one CORESET.

Preferably, the path-loss RS of the at least one PUCCH is determined based on an RS of a TCI state with the lowest index within at least one TCI state activated for a downlink signal on the first component carrier.

Preferably, the first component carrier is not configured with a CORESET.

Preferably, the first uplink signal comprises at least one SRS, and the at least one power control parameter comprises at least one of a target power, a scaling factor, a power control adjustment state or a path-loss RS of the at least one SRS.

Preferably, at least one of the target power or the scaling factor of the at least one SRS is determined based on a SRS resource set configured by at least one higher layer parameter.

Preferably, the power control adjustment state of the at least one SRS is set to be the same with a power control adjustment state of a transmission of a physical uplink shared channel, PUSCH.

Preferably, when the first component carrier is configured with at least one CORESET, the path-loss RS of the at least one SRS is determined based on an RS of a TCI state applied for a CORESET with the lowest index within the at least one CORESET or a QCL assumption for the CORESET with the lowest index within the at least one CORESET.

Preferably, the path-loss RS of the at least one SRS is determined based on an RS of a TCI state with the lowest index within at least one TCI state activated for a downlink signal on the first component carrier.

Preferably, the first component carrier is not configured with a CORESET.

Preferably, the first uplink signal comprises at least one PUSCH, and the at least one power control parameter comprises at least one of a target power, a scaling factor, a closed loop index or a path-loss RS of the at least one PUSCH.

Preferably, wherein the target power of the at least one PUSCH is determined by an entry having one of a specific index, the highest index or a lowest index in a target power set or a mapping set between SRS resource indicator (SRI) and PUSCH power control parameters.

Preferably, the scaling factor of the at least one PUSCH is determined by an entry having one of a specific index, the highest index or a lowest index in a scaling factor set or a mapping set between SRI and PUSCH power control parameters.

Preferably, the closed loop index of the at least one PUSCH is one of a specific index, the highest index or the lowest index within a range of the closed loop index.

Preferably, the path-loss RS of the at least one PUSCH is determined according to a path-loss RS which is associated with a SRS associated with the at least one PUSCH.

Preferably, the at least one PUSCH is not configured with the path-loss RS.

Preferably, the first uplink signal is not configured with the spatial relation.

Preferably, the first uplink signal is not configured with the at least one power control parameter.

Preferably, the first uplink signal comprises at least one of a SRS, a PUSCH or a PUCCH, and the at least one power control parameter comprises a path-loss RS.

Preferably, the first uplink signal comprises at least one PUSCH, and the at least one power control parameter comprises a path-loss RS of a SRS associated with the at least one PUSCH.

Preferably, the first uplink signal comprises at least one PUSCH, and

Preferably, the SRS for a non-codebook transmission or a codebook transmission is not configured with a path-loss RS.

Preferably, the wireless terminal receives a MAC-CE activation command for activating a TCI state or receives a configuration command for a TCI state.

Preferably, the wireless terminal receives a MAC CE activation command for activating or updating the at least one power control parameter or receives a configuration command for the at least one power control parameter, and the at least one power control parameter comprises at least one of a target power, a scaling factor or a closed loop index.

Preferably, the wireless communication method further comprises receiving a signaling configured to determine the at least one power control parameter for the first uplink signal.

Preferably, the first uplink signal comprises at least one PUCCH, and spatial relation of the at least one PUCCH is not configured Preferably, when a time unit of the first uplink signal on the first component carrier collides with a time unit of a second uplink signal on a second component carrier, at least one of the spatial relation or a path-loss RS of the first uplink signal is determined based on at least one of the spatial relation or the path-loss RS of the second uplink signal.

Preferably, when a time unit of the first uplink signal on the first component carrier collides with a time unit of a second uplink signal on a second component carrier, the first uplink signal is prioritized for uplink transmission.

Preferably, when a time unit of the first uplink signal on the first component carrier collides with a time unit of a second uplink signal on a second component carrier, refraining the second uplink signal from uplink transmission.

Preferably, an index of the first component carrier is smaller than an index of the second component carrier.

Preferably, when an index of the first component carrier is higher than an index of the second component carrier.

Preferably, the first component carrier is configured with at least one CORESET and the second component carrier is not configured with a CORESET.

Preferably, the first component carrier is not configured with a CORESET and the second component carrier is configured with at least one CORESET.

Preferably, the first component carrier and the second component carrier are within a component carrier group or a bandwidth part.

Preferably, the at least one of at least one power control parameter or spatial relation of the first uplink signal is determined based on at least one of transmission parameter of a downlink signal.

Preferably, the downlink signal is determined according to the slot overlapping with the first uplink signal.

Preferably, the downlink signal is a CORESET with the lowest index within at least one CORESET in the latest slot no later than a slot overlapping with the first uplink signal.

Preferably, the slot overlapping with the first uplink signal is the first slot overlapping with the first uplink signal or the first slot fully overlapping with the first uplink signal.

Preferably, the slot overlapping with the first uplink signal is the last slot overlapping with the slot of the first uplink signal or the last slot fully overlapping with the slot of first uplink signal.

Preferably, the first uplink signal is transmitted in a slot n, wherein the downlink signal is transmitted in a slot m, and wherein m is less than or equal to $$n \cdot \left\lfloor \frac{2^{\mu_{DL}}}{2^{\mu_{UL}}} \right\rfloor,$$

wherein $\mu_{DL}$ is a subcarrier spacing of a downlink signal or a downlink slot, and wherein $\mu_{UL}$ is a subcarrier spacing of a uplink signal or a uplink slot.

Preferably, the first uplink signal is transmitted in the slot n, wherein the downlink signal is transmitted in the latest slot no latter than a slot $$n \cdot \left\lfloor \frac{2^{\mu_{DL}}}{2^{\mu_{UL}}} \right\rfloor,$$

wherein $\mu_{DL}$ is a subcarrier spacing for a downlink signal or a downlink slot, and wherein $\mu_{UL}$ is a subcarrier spacing for a uplink signal or a uplink slot.

The present disclosure relates to a wireless communication method for use in a wireless network node. The wireless communication method comprises receiving, from a wireless terminal, a first uplink signal on a first component carrier, based on at least one of at least one power control parameter or spatial relation of the first uplink signal.

Various embodiments may preferably implement the following features:

Preferably, when a transmission configuration indicator, TCI, state has a plurality of reference signal, RS, indexes, an RS index associated with a Quasi co-location, QCL, Type of a spatial parameter is used for determining at least one of the at least one power control parameter or the spatial relation of the first uplink signal.

Preferably, the at least one power control parameter comprises a path-loss RS, the first uplink signal comprises at least one physical uplink control channel, PUCCH, and the wireless network node transmits a medium access control, MAC, control element, CE, for updating a path-loss RS of the at least one PUCCH.

Preferably, the spatial relation is determined based on at least one transmission parameter associated with a downlink signal on the first component carrier.

Preferably, the first uplink signal comprises at least one of a sounding reference signal, SRS, a physical uplink shared channel, PUSCH, or a PUCCH.

Preferably, the at least one transmission parameter comprises at least one of a spatial domain filter, a transmission configuration indicator, TCI, state or a Quasi co-location, QCL, assumption.

Preferably, when the first component carrier is configured with at least one control resource set, CORESET, the spatial relation of the first uplink signal is determined based on the at least one transmission parameter of a CORESET with the lowest index within the at least one CORESET.

Preferably, the CORESET with the lowest index and the first uplink signal are associated with the same CORESET pool index or the same CORESET group.

Preferably, when the first component carrier is not configured with a CORESET, the spatial relation of the first uplink signal is determined based on a TCI state with the lowest index within at least one TCI state activated for the downlink signal.

Preferably, when the at least one TCI state for the downlink signal is not configured or activated, the spatial relation of the first uplink signal is determined based on the at least one transmission parameter of a CORESET or a PDCCH, and the CORESET or the PDCCH schedules the first uplink signal.

Preferably, the first uplink signal comprises at least one physical uplink control channel, PUCCH, and the at least one power control parameter comprises at least one of a target power, a closed loop index or a path-loss reference signal, RS, of the at least one PUCCH.

Preferably, the target power of the at least one PUCCH is determined by an entry having one of a specific index, the highest index or the lowest index in a target power set.

Preferably, the closed loop index of the at least one PUCCH is one of a specific index, the highest index or the lowest index within a range of the closed loop index.

Preferably, the closed loop index of the at least one PUCCH is determined based on a TCI state applied to a CORESET with the lowest index within at least one CORESET or a TCI state with the lowest index within at least one TCI state activated for a downlink signal on the first component carrier.

Preferably, when the first component carrier is configured with at least one CORESET, the path-loss RS of the at least one PUCCH is determined based on an RS of a TCI state applied for a CORESET with the lowest index within the at least one CORESET or a QCL assumption for the CORESET with the lowest index within the at least one CORESET.

Preferably, the path-loss RS of the at least one PUCCH is determined based on an RS of a TCI state with the lowest index within at least one TCI state activated for a downlink signal on the first component carrier.

Preferably, the first component carrier is not configured with a CORESET.

Preferably, the first uplink signal comprises at least one SRS, and the at least one power control parameter comprises at least one of a target power, a scaling factor, a power control adjustment state or a path-loss RS of the at least one SRS.

Preferably, at least one of the target power or the scaling factor of the at least one SRS is determined based on a SRS resource set configured by at least one higher layer parameter.

Preferably, the power control adjustment state of the at least one SRS is set to be the same with a power control adjustment state of a transmission of a physical uplink shared channel, PUSCH.

Preferably, when the first component carrier is configured with at least one CORESET, the path-loss RS of the at least one SRS is determined based on an RS of a TCI state applied for a CORESET with the lowest index within the at least one CORESET or a QCL assumption for the CORESET with the lowest index within the at least one CORESET.

Preferably, the path-loss RS of the at least one SRS is determined based on an RS of a TCI state with the lowest index within at least one TCI state activated for a downlink signal on the first component carrier.

Preferably, the first component carrier is not configured with a CORESET.

Preferably, the first uplink signal comprises at least one PUSCH, and wherein the at least one power control parameter comprises at least one of a target power, a scaling factor, a closed loop index or a path-loss RS of the at least one PUSCH.

Preferably, the target power of the at least one PUSCH is determined by an entry having one of a specific index, the highest index or a lowest index in a target power set or a mapping set between SRS resource indicator (SRI) and PUSCH power control parameters.

Preferably, the scaling factor of the at least one PUSCH is determined by an entry having one of a specific index, the highest index or a lowest index in a scaling factor set or a mapping set between SRI and PUSCH power control parameters.

Preferably, the closed loop index of the at least one PUSCH is one of a specific index, the highest index or the lowest index within a range of the closed loop index.

Preferably, the path-loss RS of the at least one PUSCH is determined according to a path-loss RS which is associated with a SRS associated with the at least one PUSCH.

Preferably, the at least one PUSCH is not configured with the path-loss RS.

Preferably, the first uplink signal is not configured with the spatial relation.

Preferably, the first uplink signal is not configured with the at least one power control parameter.

Preferably, the first uplink signal comprises at least one of a SRS, a PUSCH or a PUCCH, and wherein the at least one power control parameter comprises a path-loss RS.

Preferably, the first uplink signal comprises at least one PUSCH, and the at least one power control parameter comprises a path-loss RS of a SRS associated with the at least one PUSCH.

Preferably, the first uplink signal comprises at least one PUSCH, and the SRS for a non-codebook transmission or a codebook transmission is not configured with a path-loss RS.

Preferably, the wireless network node transmits a MAC-CE activation command for activating a TCI state or transmits a configuration command for a TCI state.

Preferably, the wireless network node transmits a MAC CE activation command for activating or updating the at least one power control parameter or transmits a configuration command for the at least one power control parameter, and the at least one power control parameter comprises at least one of a target power, a scaling factor or a closed loop index.

Preferably, the wireless communication method further comprises transmitting, to the wireless terminal, a signaling configured to determine the at least one power control parameter for the first uplink signal.

Preferably, the first uplink signal comprises at least one PUCCH, and

Preferably, spatial relation of the at least one PUCCH is not configured.

Preferably, when a time unit of the first uplink signal on the first component carrier collides with a time unit of a second uplink signal on a second component carrier, at least one of the spatial relation or a path-loss RS of the first uplink signal is determined based on at least one of the spatial relation or the path-loss RS of the second uplink signal.

Preferably, when a time unit of the first uplink signal on the first component carrier collides with a time unit of a second uplink signal on a second component carrier, the first uplink signal is prioritized for uplink transmission.

Preferably, when a time unit of the first uplink signal on the first component carrier collides with a time unit of a second uplink signal on a second component carrier, the second uplink signal is refrained from uplink transmission.

Preferably, an index of the first component carrier is smaller than an index of the second component carrier.

Preferably, when an index of the first component carrier is higher than an index of the second component carrier.

Preferably, the first component carrier is configured with at least one CORESET and the second component carrier is not configured with a CORESET.

Preferably, the first component carrier is not configured with a CORESET and the second component carrier is configured with at least one CORESET.

Preferably, the first component carrier and the second component carrier are within a component carrier group or a bandwidth part.

Preferably, the at least one of at least one power control parameter or spatial relation of the first uplink signal is determined based on at least one of transmission parameter of a downlink signal.

Preferably, the downlink signal is determined according to the slot overlapping with the first uplink signal.

Preferably, the downlink signal is a CORESET with the lowest index within at least one CORESET in the latest slot no later than the slot overlapping with the first uplink signal.

Preferably, the slot overlapping with the first uplink signal is the first slot overlapping with the first uplink signal or the first slot fully overlapping with the first uplink signal.

Preferably, the slot overlapping with the first uplink signal is the last slot overlapping with the slot of the first uplink signal or the last slot fully overlapping with the slot of first uplink signal.

Preferably, the first uplink signal is transmitted in a slot n, wherein the downlink signal is transmitted in a slot m, and wherein m is less than or equal to $$n \cdot \left\lfloor \frac{2^{\mu_{DL}}}{2^{\mu_{UL}}} \right\rfloor,$$

wherein $\mu_{DL}$ is a subcarrier spacing of a downlink signal or a downlink slot, and wherein $\mu_{UL}$ is a subcarrier spacing of a uplink signal or a uplink slot.

Preferably, the first uplink signal is transmitted in the slot n, wherein the downlink signal is transmitted in the latest slot no latter than a slot $$n \cdot \left\lfloor \frac{2^{\mu_{DL}}}{2^{\mu_{UL}}} \right\rfloor,$$

wherein $\mu_{DL}$ is a subcarrier spacing for a downlink signal or a downlink slot, and wherein $\mu_{UL}$ is a subcarrier spacing for a uplink signal or a uplink slot.

The present disclosure relates to a wireless terminal. The wireless terminal comprises:
  a processor, configured to determine at least one of at least one power control parameter or spatial relation for a first uplink signal on a first component carrier; and
  a communication unit, configured to transmit, to a wireless network node, the first uplink signal on the first component carrier based on the at least one of determined at least one power control parameter or determined spatial relation.

Various embodiments may preferably implement the following feature:

Preferably, the processor is further configured to perform the wireless communication method of aforementioned wireless communication method.

The present disclosure relates to a wireless network node. The wireless network node comprises:
- a communication unit, configured to receive, from a wireless terminal, a first uplink signal on a first component carrier, wherein at least one of at least one power control parameter or spatial relation of the first uplink signal is associated with the first uplink signal.

Various embodiments may preferably implement the following feature:

Preferably, the wireless network node further comprises a processor, configured to perform the aforementioned wireless communication method.

The present disclosure relates to a computer program product comprising a computer-readable program medium code stored thereupon, the code, when executed by a processor, causing the processor to implement the aforementioned wireless communication method.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION OF EXAMPLE EMBODIMENTS

Figure 1:
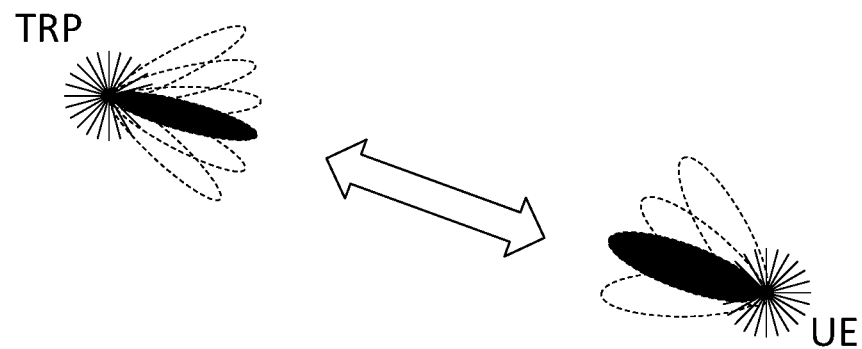
FIG. 1 shows a schematic diagram of a case of one PRP and one UE.
Figure 2:
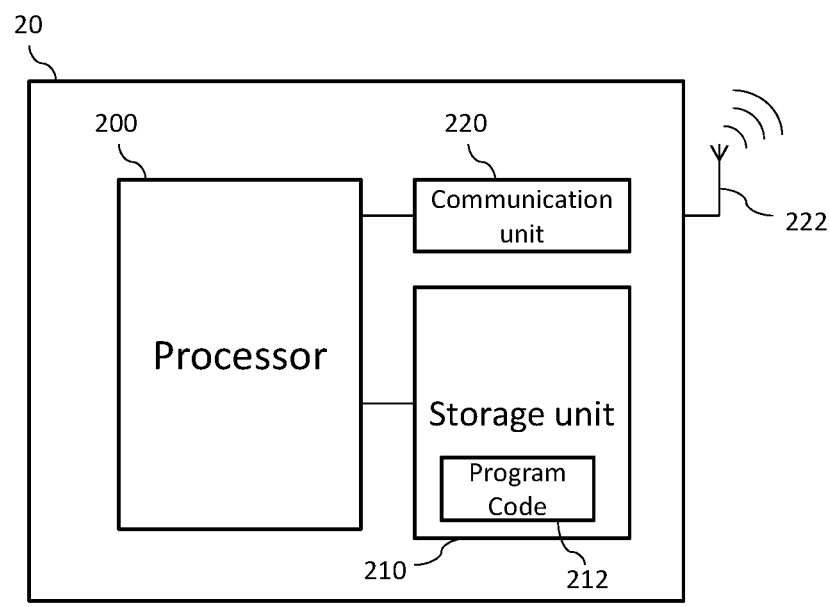
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
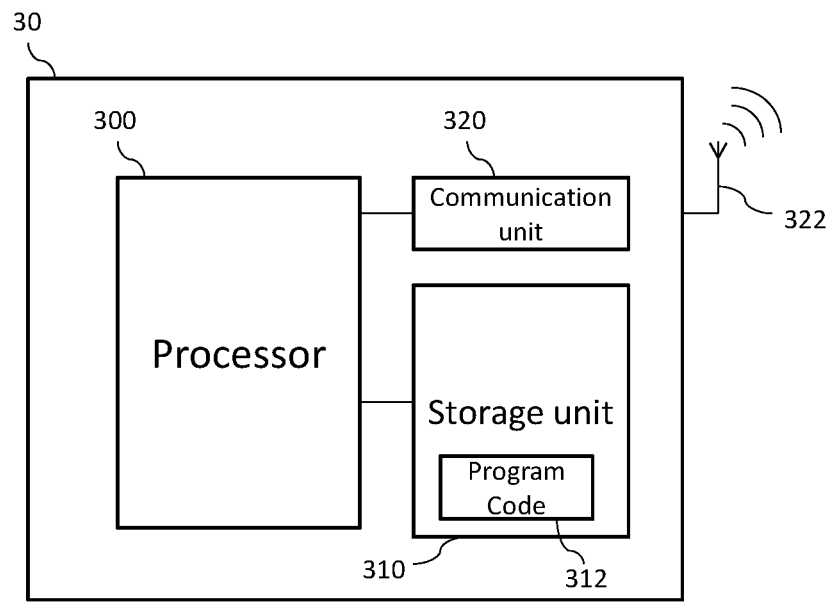
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a base station (BS), a network entity, a Mobility Management Entity (MME), Serving Gateway (S-GW), Packet Data Network (PDN) Gateway (P-GW), or Radio Network Controller (RNC), and is not limited herein. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Note that, in this disclosure, the definition of "beam" is equivalent to quasi-co-location (QCL) state, transmission configuration indicator (TCI) state, spatial relation state (also called as spatial relation information state), reference signal (RS), spatial filter or pre-coding. Specifically:

a) The definition of "Tx beam" is equivalent to a QCL state, a TCI state, a spatial relation state, a DL/UL reference signal (such as a channel state information reference signal (CSI-RS), a synchronization signal block (SSB) (which is also called as SS/PBCH), a demodulation reference signal (DMRS), a sounding reference signal (SRS), and a physical random access channel (PRACH)), a Tx spatial filter or a Tx precoding;

b) The definition of "Rx beam" is equivalent to a QCL state, a TCI state, a spatial relation state, a spatial filter, a Rx spatial filter or a Rx precoding;

c) The definition of "beam ID" is equivalent to a QCL state index, a TCI state index, a spatial relation state index, a reference signal index, a spatial filter index or a precoding index.

Specifically, "spatial filter" may be either UE-side or gNB-side, and the spatial filter is also called as a spatial-domain filter.

Note that, in this disclosure, "spatial relation information" is comprised of one or more reference RSs, which is used to represent the same or quasi-co "spatial relation" between targeted "RS or channel" and the one or more reference RSs.

Note that, in this disclosure, "spatial relation" means the beam, spatial parameter, or spatial domain filter.

Note that, in this disclosure, "QCL state" is comprised of one or more reference RSs and their corresponding QCL type parameters, where QCL type parameters include at least one of the following aspect or combination: (1) Doppler spread, (2) Doppler shift, (3) delay spread, (4) average delay, (5) average gain or (6) Spatial parameter.

In this disclosure, "TCI state" is equivalent to "QCL state".

In this disclosure, QCL type-D is equivalent to spatial parameter or spatial Rx parameter.

Note that, in this disclosure, a UL signal may be a PUCCH, a PUSCH, or a SRS.

Note that, in this disclosure, a time unit may be a sub-symbol, a symbol, a slot, a subframe, a frame, or a transmission occasion.

Note that, in this disclosure, the UL power control parameter includes a target power (also called as P0), a path loss RS, a scaling factor for path loss (also called as alpha), or a closed loop index.

Note that, in this disclosure, the path-loss may be a couple loss.

Note that, in this disclosure, the monitored DL slot is equivalent to the slot with the monitoring CORESET, or the slot with PDCCH reception.

Note that, in this disclosure, the component carrier is equivalent to a cell.

Note that, in this disclosure, "collide with" is equivalent to "overlap with", or "associated with".

Note that, in this disclosure, the higher layer parameter is the parameter with a level higher than a L1 level (e.g. physical layer), e.g., a L2 level parameter, a L3 level parameter, or a radio resource control (RRC) parameter, or a medium access control (MAC) control element (CE) parameter, etc.

In order to decrease the overhead of the higher layer parameters, the present disclosure provides a wireless communication method for a wireless terminal/wireless network node and for determining at least one of at least one power control parameter or spatial relation of an uplink (UL) signal on a component without using the higher layer parameters of configuring the spatial relation and/or the at least one power control parameter.

In an embodiment, when a transmission configuration indicator, TCI, state has a plurality of reference signal, RS, indexes or a plurality of quasi co-location, QCL, types, an RS index associated with a QCL Type of a spatial parameter (i.e. QCL type D) is used for determining at least one of the at least one power control parameter or the spatial relation of the UL signal.

In an embodiment, when the wireless terminal receives a medium access control, MAC, control element, CE, configured for updating a path-loss RS of at least one physical uplink control channel, PUCCH, in the UL signal, the at least one power control parameter comprises at least the path-loss RS. That is, when the wireless terminal receives the MAC CE configured for updating the path-loss RS of at least one PUCCH in the UL signal, the wireless terminal determines the path-loss RS of the UL signal without being configured by the higher layer parameter.

In an embodiment, the spatial relation of the UL signal is determined without being configured by the higher layer parameter. In this embodiment, the spatial relation of the UL signal may be determined based on at least one transmission parameter associated with a downlink (DL) signal on the same component carrier, so as to not only decrease the overhead of the higher layer parameter but also align a beam behavior between the DL signal and the UL signal. Note that, the UL signal comprises at least one of a sounding reference signal, SRS, a physical uplink shared channel (PUSCH) or a physical uplink control channel (PUCCH). In addition, the at least one transmission parameter comprises at least one of a spatial domain filter, a TCI state or a Quasi co-location (QCL) assumption of the DL signal (e.g. physical downlink shared channel (PDSCH)).

When the component carrier is configured with at least one control resource set (CORESET), e.g. in the DL signal, the spatial relation of the UL signal is determined based on the TCI state or the QCL assumption of the CORESET with the lowest index (e.g. identification (ID)) within the at least one CORESET on the component carrier. In an example, the spatial relation of the UL signal is determined based on the TCI state or the QCL assumption of the CORESET with the lowest index within the at least one CORESET in the most recent monitored DL slot on the component carrier, wherein the most recent monitored DL slot is the DL slot with the at least one CORESET and is no later than the slot on which the UL signal is configured. The details of determining the most recent monitored DL slot would be illustrated in subsequent paragraphs.

In an embodiment, the CORESET with the lowest index and the UL signal are associated with the same CORESET pool index or the same CORESET group.

In an embodiment, the CORESET can be selected from the one or more CORESETs with the same CORESET pool index or same CORESET group as the UL signal.

Figure 4:
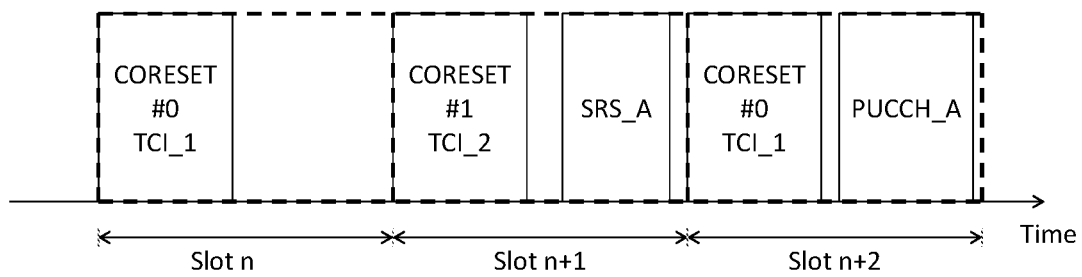
FIG. 4 shows a schematic diagram of a component carrier according to an embodiment of the present disclosure

FIG. 4 shows a schematic diagram of a component carrier according to an embodiment of the present disclosure. In FIG. 4, the component carrier are configured with the CORESETs for each of slots n, n+1 and n+2. In addition, the CORESET with the lowest index within the CORESETS in the slot n is the CORESET with the index 0 (i.e. CORESET #0) and a TCI state TCI_1, the CORESET with the lowest index within the CORESETS in the slot n+1 is the CORESET with the index 1 (i.e. CORESET #1) and a TCI state TCI_2, and the CORESET with the lowest index within the CORESETS in the slot n+2 is the CORESET with the index 0 and the TCI state TCI_1. In this embodiment, the spatial relation of the UL signal is determined based on the TCI state of the CORESET with the lowest index in the most recent monitored DL slot. Thus, the spatial relation of a SRS SRS_A (i.e. UL signal) in the slot n+1 is determined based on the TCT state TCI_2 of the CORESET #1 which is the CORESET with the lowest index in the most recent monitored DL slot to the slot n+1 of the SRS SRS_A. Similarly, the spatial relation of a PUCCH PUCCH_A (i.e. UL signal) in the slot n+2 is determined based on the TCT state TCI_1 of the CORESET #0 which is the CORESET with the lowest index in the most recent monitored DL slot to the slot n+2 of the PUCCH PUCCH_A.

In an embodiment, when the component carrier is configured without (i.e. is not configured with) the CORESET, the spatial relation of the UL signal is determined based on a TCI state with the lowest index within at least one TCI state activated for the DL signal. In an example, when the at least one TCI state for the DL signal is not configured or activated, the spatial relation of the UL signal is determined based on the at least one transmission parameter of a CORESET or a PDCCH, wherein the CORESET or the PDCCH schedules the UL signal.

In an embodiment, when the at least one TCI state for the DL signal is not configured or activated, the spatial relation of the UL signal is determined based on the at least one transmission parameter of a CORESET or a PDCCH, wherein the CORESET or the PDCCH schedules the first uplink signal.

Figure 5:
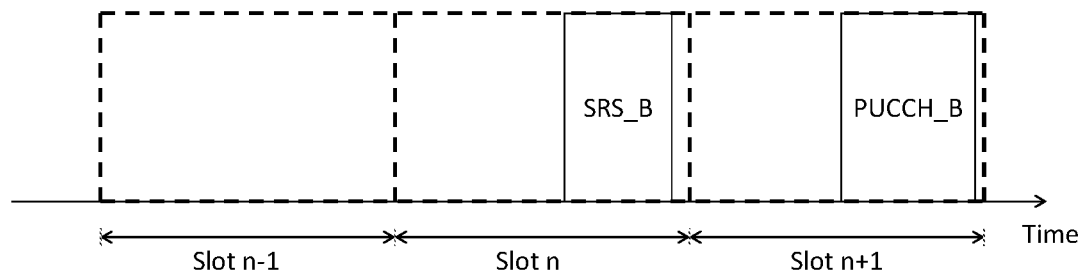
FIG. 5 shows a schematic diagram of a component carrier according to an embodiment of the present disclosure.

FIG. 5 shows a schematic diagram of a component carrier according to an embodiment of the present disclosure. In FIG. 5, the component carrier is configured without the CORESET and the TCI state with the lowest index within at least one TCI state activated for a PDSCH (i.e. DL signal) on the component carrier is the TCI state TCI_1. Because the component carrier is not configured with the CORESET, the spatial relation of UL signals on the component carrier is determined based on the TCI state TCI_1 which is the TCI state with the lowest index within at least one TCI state activated for the PDSCH. That is, spatial information of a SRS SRS_B in the slot n+1 and a PUCCH PUCCH_B in the slot n+2 is determined based on the TCI state TCI_1.

In an embodiment, the at least one power control parameter of the UL signal (e.g. a PUSCH, a PUCCH, or a SRS) is determined without being configured by the higher layer, so as to decrease the overhead of the higher layer parameters.

When the UL signal comprises at least one PUCCH, the at least one power control parameter being determined comprises at least one of a target power (e.g. may be named P0), a closed loop index or a path-loss RS of the at least one PUCCH.

In an embodiment, the target power of the at least one PUCCH is determined by an entry having one of a specific index (e.g. 0), the highest index or the lowest index in a target power set.

In an embodiment, the closed loop index of the at least one PUCCH is one of a specific index (e.g. 0), the highest index or the lowest index within a range of the closed loop index.

In an embodiment, the closed loop index of the at least one PUCCH is determined based on a TCI state applied to a CORESET with the lowest index within at least one CORESET or a TCI state with the lowest index within at least one TCI state activated for a DL signal on the component carrier.

In an embodiment of the component carrier of the UL signal being configured with at least one CORESET, the path-loss RS of the at least one PUCCH is determined based on an RS of a TCI state applied for a CORESET with the lowest index within the at least one CORESET or a QCL assumption for the CORESET with the lowest index within the at least one CORESET.

In an embodiment, the path-loss RS of the at least one PUCCH is determined based on an RS of a TCI state with the lowest index within at least one TCI state activated for a DL signal (e.g. PDSCH) on the component carrier. In this embodiment, the component carrier may not be configured with the CORESET.

In an embodiment, when the UL signal comprises at least one SRS, the at least one power control parameter being determined comprises at least one of a target power, a scaling factor (e.g. may be named alpha), a power control adjustment state or a path-loss RS of the at least one SRS.

In an embodiment, the target power of the at least one SRS may be determined based on a SRS resource set, e.g., configured by higher layer parameter(s).

In an embodiment, the scaling factor of the at least one SRS may be determined also based on the SRS resource set configured by the higher layer parameter(s). That is, at least one of the target power or the scaling factor of the at least one SRS is determined based on the SRS resource set configured by at least one higher layer parameter.

In an embodiment, the power control adjustment state of the at least one SRS is set to be the same with a power control adjustment state of a transmission of a PUSCH on the component carrier.

In an embodiment, when the component carrier is configured with at least one CORESET, the path-loss RS of the at least one SRS is determined based on a RS of a TCI state applied for a CORESET with the lowest index within the at least one CORESET or a QCL assumption for the CORESET with the lowest index within the at least one CORESET.

In an embodiment, the path-loss RS of the at least one SRS is determined based on a RS of a TCI state with the lowest index within at least one TCI state activated for a DL signal on the component carrier. In this embodiment, the component carrier may not be configured with the CORESET.

In an embodiment, when the UL signal comprises at least one PUSCH, the at least one power control parameter being determined comprises at least one of a target power, a scaling factor, a closed loop index or a path-loss RS of the at least one PUSCH.

In an embodiment, the target power of the at least one PUSCH is determined by an entry having one of a specific index (e.g. 0), the highest index or a lowest index in a target power set or a SRS resource indicator (SRI) PUSCH power control set.

In an embodiment, the scaling factor of the at least one PUSCH is determined by an entry having one of a specific index, the highest index or a lowest index in a scaling factor set or a SRI-PUSCH power control set, e.g., configured by the higher layer parameter(s).

In an embodiment, the closed loop index of the at least one PUSCH is one of a specific index, the highest index or the lowest index within a range of the closed loop index.

In an embodiment, the path-loss RS of the at least one PUSCH is determined according to a path-loss RS which is associated with a SRS associated with the at least one PUSCH. Note that, the at least one PUSCH may not configured with the path-loss RS in this embodiment. In an embodiment, the SRS associated with the at least one PUSCH is a SRS used for codebook transmission or a SRS used for non-codebook transmission. In an embodiment, when there are more than one SRS resource configured in the SRS resource set, the association between SRS and the at least one PUSCH is indicated by the SRS resource indicator (SRI) field in DCI.

In an embodiment, when the path-loss RS (i.e. one of the at least one power control parameter) is configured for the UL signal, e.g., by the higher layer parameter, the path-loss RS of the UL signal may be overwritten by results of determining the path-loss RS of the UL signal according to the aforementioned embodiments.

In an embodiment, when a TCI state has a plurality of RS indexes (e.g. 2 RS indexes) or a plurality of QCL types (e.g. 2 QCL types), the RS index associated with a QCL Type configured for a spatial parameter (e.g. QCL type D) is used for determining the at least one power control parameter of the UL signal.

The at least one power control parameter of the UL signal may be determined without being configured by the higher layer parameter(s) in at least one of the following Embodiments (1) to (5):

Embodiment (1): The UL signal is not configured with the spatial relation.

Embodiment (2): The UL signal is not configured with the at least one power control parameter.

In an example of the embodiment (2), at least one of a SRS, a PUSCH or a PUCCH in the UL signal may not be configured with a path-loss RS.

In an example of embodiment (2), the UL signal may comprise at least one PUSCH and a path-loss RS of a SRS associated with the at least one PUSCH is not configured to the wireless terminal.

In an example of embodiment (2), the UL signal may comprise at least one PUSCH and the SRS for a non-codebook transmission or a codebook transmission is not configured with a path-loss RS.

Embodiment (3): The wireless terminal receives a medium access control, MAC, control element, CE, activation command for activating a TCI state or receives a configuration command for a TCI state.

Embodiment (4): The wireless terminal receives a MAC CE activation command for activating or updating the at least one power control parameter or receives a configuration command for the at least one power control parameter.

In the embodiment (4), the at least one power control parameter comprises at least one of a target power, a scaling factor or a closed loop index.

Embodiment (5): The wireless terminal receives a signaling configured to determine the at least one power control parameter for the UL signal.

In the embodiment (5), the signaling may be a higher layer parameter. Furthermore, the higher layer parameter may be one of "enableDefaultBeamForUL" or "enableDefaultPowerControlForUL".

In an embodiment, when the wireless terminal only supports one active DL or UL beam at a given time, the path-loss RS for at least one PUSCH and/or at least one SRS in the UL signal may be determined based on the aforementioned embodiment if the wireless terminal receives a MAC CE configured for updating the path-loss RS for the at least one PUSCH and/or the at least one SRS.

In an embodiment, when the wireless terminal receives a MAC CE for updating a path-loss RS of at least one PUCCH in the UL signal, the wireless terminal determines the path-loss RS of the at least one PUCCH according to the aforementioned embodiments. In this embodiment, spatial relation of the at least one PUCCH may not be configured.

In an embodiment of carrier aggregation (CA), time units of UL signals on multiple component carriers may collide with each other. For example, a time unit of a UL signal U1 on a component carrier CC_A may collide with a time unit of another UL signal U2 on another component carrier CC_B. Under such a condition, at least one of the at least one power control parameter or the spatial information of one of the UL signals U1 and U2 may be required to change to another one of the UL signals U1 and U2.

In an embodiment, when the time unit of the UL signal U1 on the component carrier CC_A collides with the time unit of the UL signal U2 on the component carrier CC_B, one of the UL signals U1 and U2 is prioritized for the UL transmission.

In an embodiment, when the time unit of the UL signal U1 on the component carrier CC_A collides with the time unit of the UL signal U2 on the component carrier CC_B, one of the UL signals U1 and U2 is refrained from the UL transmission.

In an embodiment, the UL signal has a higher priority when corresponding to the component carrier having a smaller (e.g. lower) index. For example, when the index of the component carrier CC_A is smaller than the index of the component carrier CC_B, the UL signal U1 is prioritized (e.g. has higher priority over the UL signal U2) for the UL transmissions, and vice versa.

In an embodiment, the UL signal has a higher priority when corresponding to the component carrier having a greater (e.g. higher) index. For example, when the index of the component carrier CC_A is greater than the index of the component carrier CC_B, the UL signal U1 is prioritized (e.g. has higher priority over the UL signal U2) for the UL transmissions, and vice versa.

In an embodiment, the component carrier configured with at least one CORESET has a higher priority than that of the component carrier not configured with the CORESET. For example, the component carrier CC_A (i.e. the UL signal U1) has a higher priority when the component carrier CC_A is configured with the at least one CORESET and the component carrier CC_B is not configured with the CORESET.

In an embodiment, the component carrier not configured with the CORESET has a higher priority than that of the component carrier configured with the at least one CORESET. For example, the component carrier CC_A (i.e. the UL signal U1) has a higher priority when the component carrier CC_B is configured with the at least one CORESET and the component carrier CC_A is not configured with the CORESET.

In an embodiment, the at least one power control parameter of the UL signal with lower priority is determined based on the at least one power control parameter of the UL signal with higher priority. For example, when the time unit of the UL signal U1 on the component carrier CC_A collides with the time unit of the UL signal U2 on the component carrier CC_B and the UL signal U2 has the higher priority because the index of the component carrier CC_B is smaller than that of the component carrier CC_A, the least one power control parameter of the UL signal U1 is determined based on (e.g. set as) the at least one power control parameter of the UL signal U2.

In an embodiment, the spatial relation of the UL signal with a lower priority is determined based on the spatial relation of the UL signal with a higher priority. For example, when the time unit of the UL signal U1 on the component carrier CC_A collides with the time unit of the UL signal U2 on the component carrier CC_B and the UL signal U2 has the higher priority because the index of the component carrier CC_B is greater than that of the component carrier CC_A, the spatial relation of the UL signal U1 is determined based on (e.g. set as) the spatial relation of the UL signal U2.

In an embodiment, the UL signal with a higher priority is prioritized for the UL transmission. For example, when the time unit of the UL signal U1 on the component carrier CC_A collides with the time unit of the UL signal U2 on the component carrier CC_B and the UL signal U1 has the higher priority because the component carrier CC_A is configured with the at least one CORESET and the component carrier CC_B is not configured with the CORESET, the UL signal U1 is prioritized for the UL transmission.

In an embodiment, the UL signal with a lower priority refrained from the UL transmission. For example, when the time unit of the UL signal U1 on the component carrier CC_A collides with the time unit of the UL signal U2 on the component carrier CC_B and the UL signal U2 has the lower priority because the component carrier CC_A is not configured with the CORESET and the component carrier CC_B is configured with the at least one CORESET, the UL signal U2 is refrained from the UL transmission.

Note that, in the aforementioned embodiment, the component carriers on which the collided transmissions are configured (e.g. the component carriers CC_A and CC_B) are in the same component carrier group and/or in the same bandwidth part.

Figure 6:
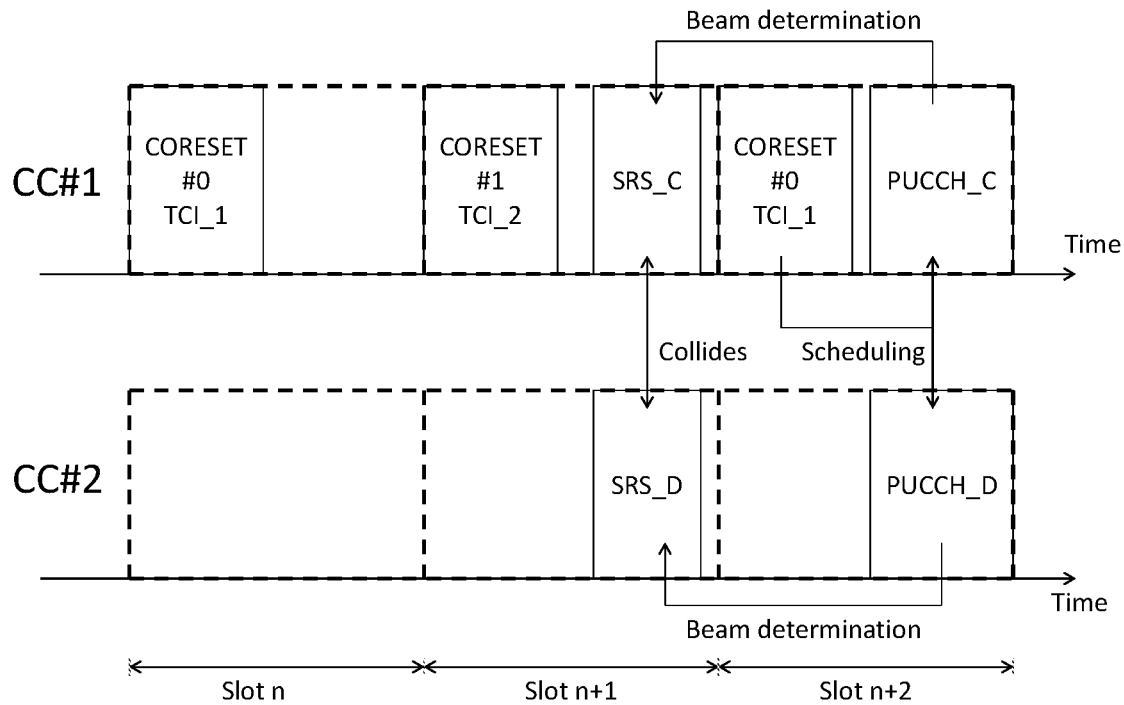
FIG. 6 shows a schematic diagram of component carriers according to an embodiment of the present disclosure.

FIG. 6 shows a schematic diagram of component carriers according to an embodiment of the present disclosure. In FIG. 6, a component carrier with an index 1 (i.e. CC #1) is configured with CORESETs and a component carrier with an index 2 (CC #2) is not configured with a CORESET. For the component carrier CC #2, the first entry having the lowest index of the activated TCI states is a TCI state TCI_1. In this embodiment, the UL signal has a higher priority when corresponding to the component carrier with the smaller index.

As shown in FIG. 6, two SRS (i.e. UL signals) SRS_C and SRS_D scheduled at a slot n+1. Because the component carrier CC #1 has smaller index, a spatial relation of the SRS SRS_D is determined based on that of the SRS SRS_C (i.e. TCI state TCI_2). Furthermore, a path-loss RS of the SRS SRS_D is determined based on that of the SRS SRS_C (e.g. a QCL type D RS of the CORSET #1).

In addition, two PUSCHs (i.e. UL signals) PUSCH_C and PUSCH_D collide with each other at a slot n+2. Note that, the most recent transmission of a SRS resource which is prior to a PUSCH carrying a SRI is used for determining a transmission of the PUSCH. Therefore, the SRS SRS_C and SRS_D are used for determining the transmissions (e.g. beam) of the PUSCH PUSCH_C and PUSCH_D, respectively. Because the spatial relation of the SRS SRS_D is determined based on that of the SRS SRS_C, the PUSCHs PUSCH_C and PUSCH_D have the same spatial relation, e.g., UL beam, and both of the PUSCHs PUSCH_C and PUSCH_D can be transmitted simultaneously accordingly.

In an embodiment, the at least one of at least one power control parameter or spatial relation of the UL signal is determined based on at least one of transmission parameter of a DL signal on the same component carrier.

In an embodiment, the DL signal is determined according to the slot overlapping the UL signal. For example, the slot overlapping the UL signal is the latest slot no later than the slot overlapping with the UL signal. Please refer to FIG. 4, the SRS SRS_A overlaps the slot n+1 which is also the latest slot for the DL transmission no later than the slot overlapping the SRS SRS_A. Thus, the at least one of at least one power control parameter or spatial relation of the SRS SRS_A is determined based on the CORESET #1 (i.e. the DL signal) in the slot n+1.

In an embodiment, the slot overlapping the UL signal may have multiple DL signals (e.g. multiple CORESETs). In this embodiment, the DL signal used for determining the at least one of at least one power control parameter or spatial relation of the UL signal is the DL signal with the lowest index (e.g. 0) within the DL signals in the slot overlapping the UL signal.

In an embodiment, the UL transmission and the DL transmission may have different subcarrier spacing. Under such a condition, the UL signal (e.g. the slot of the UL signal) may overlap multiple slots of the DL signals.

In an embodiment, the DL signal used for determining the at least one of at least one power control parameter or spatial relation of the UL signal is selected from the first slot or the latest slot within the slots overlapping the UL signal.

In an embodiment, the DL signal used for determining the at least one of at least one power control parameter or spatial relation of the UL signal is selected from the first slot or the last slot within the slots overlapping the UL signal (e.g. the slot of the UL signal).

Figure 7:
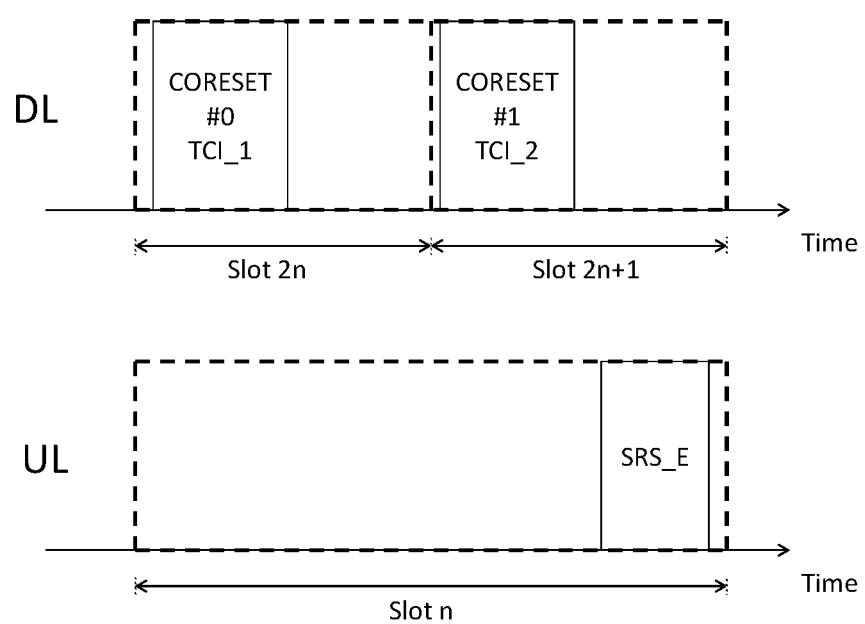
FIG. 7 shows a schematic diagram of uplink and downlink transmissions according to an embodiment of the present disclosure.

FIG. 7 shows a schematic diagram of UL and DL transmissions according to an embodiment of the present invention. In FIG. 7, the subcarrier spacing of the DL transmission is double of that of the UL transmission and one UL slot overlaps two DL slots. For example, the subcarrier spacing of the DL transmission may be 120 kHz and the subcarrier spacing of the UL transmission may be 60 kHz. As shown in FIG. 7, the slot n of the UL transmission overlapping a SRS SRS_E overlaps the slots 2n and 2n+1 of the DL transmission. In an embodiment, at least one of the at least one power control parameter or the spatial relation of the SRS SRS_E is determined based on the CORESET #0 and/or the TCI state TCI_1 of the slot 2n which is the first slot overlapping with the slot of the SRS SRS_E. In an embodiment, at least one of the at least one power control parameter or the spatial relation of the SRS SRS_E is determined based on the CORESET #1 and/or the TCI state TCI_2 of the slot 2n+1 which is the last slot overlapping the slot of the SRS SRS_E. Note that, the slot 2n+1 is also the latest slot no later than the slot n of the SRS SRS_E.

In an embodiment, the UL signal is transmitted in a slot n, wherein the downlink signal is transmitted in a slot m, and wherein m is less than or equal to $$n \cdot \left\lfloor \frac{2^{\mu_{DL}}}{2^{\mu_{UL}}} \right\rfloor,$$

wherein $\mu_{DL}$ is a subcarrier spacing of a DL signal or a DL slot, wherein $\mu_{UL}$ is a subcarrier spacing of a UL signal or a UL slot, and wherein $\lfloor \ \rfloor$ is a bottom function.

In an embodiment, the UL signal is transmitted in the slot n, wherein the downlink signal is transmitted in the latest slot no latter than a slot $$n \cdot \left\lfloor \frac{2^{\mu_{DL}}}{2^{\mu_{UL}}} \right\rfloor,$$

wherein $\mu_{DL}$ is a subcarrier spacing for a DL signal or a DL slot, and wherein $\mu_{UL}$ is a subcarrier spacing for a UL signal or a UL slot, and wherein $\lfloor \ \rfloor$ is a bottom function.

In an embodiment, the aforementioned overlapping may mean fully overlapping and/or partially overlapping.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, comprising:
   receiving a higher layer signaling, wherein the higher layer signaling is configured to determine a first path-loss reference signal (RS) of at least one physical uplink shared channel (PUSCH) on a first component carrier,
   determining the first path-loss RS of the at least one PUSCH on the first component carrier according to a second path-loss RS associated with a sounding reference signal (SRS), wherein the SRS is associated with the at least one PUSCH, and
   transmitting, to a wireless network node, the at least one PUSCH on the first component carrier based on the determined first path-loss RS of the at least one PUSCH,
   wherein the at least one PUSCH is not configured with the first path-loss RS,
   wherein the first component carrier is configured with at least one control resource set (CORESET), and wherein the second path-loss RS associated with the SRS is determined based on: a RS of a transmission configuration indicator (TCI) state applied for a CORESET with a lowest index within the at least one CORESET or a Quasi co location (QCL) assumption for the CORESET with the lowest index within the at least one CORESET.

2. A wireless communication method for use in a wireless network node, comprising:
   transmitting, to a wireless terminal, a higher layer signaling, wherein the higher layer signaling is configured to determine a first path-loss reference signal (RS) of at least one physical uplink shared channel (PUSCH) on a first component carrier, and
   receiving, from the wireless terminal, the at least one PUSCH on the first component carrier based on the first path-loss RS,
   wherein the first path-loss RS is determined according to a second path-loss RS which is associated with a sounding reference signal (SRS) associated with the at least one PUSCH, and
   wherein the at least one PUSCH is not configured with the first path-loss RS,
   wherein the first component carrier is configured with at least one control resource set (CORESET), and wherein the second path-loss RS associated with the SRS is determined based on: a RS of a transmission configuration indicator (TCI) state applied for a CORESET with a lowest index within the at least one CORESET or a Quasi co location (QCL) assumption for the CORESET with the lowest index within the at least one CORESET.

3. A wireless terminal, comprising:
   at least one processor; and
   a memory, which is configured to store at least one program;
   wherein the at least one program, when executed by the at least one processor, enables the at least one processor to perform:
      receiving a higher layer signaling, wherein the higher layer signaling is configured to determine a first path-loss reference signal (RS) of at least one physical uplink shared channel (PUSCH) on a first component carrier,
      determining the first path-loss RS of the at least one PUSCH on the first component carrier according to a second path-loss RS associated with a sounding reference signal (SRS), wherein the SRS is associated with the at least one PUSCH, and
      transmitting, to a wireless network node, the at least one PUSCH on the first component carrier based on the determined first path-loss RS of the at least one PUSCH,
   wherein the at least one PUSCH is not configured with the first path-loss RS,
   wherein the first component carrier is configured with at least one control resource set (CORESET), and wherein the second path-loss RS associated with the SRS is determined based on: a RS of a transmission configuration indicator (TCI) state applied for a CORESET with a lowest index within the at least one CORESET or a Quasi co location (QCL) assumption for the CORESET with the lowest index within the at least one CORESET.

4. A wireless network node, comprising:
   at least one processor; and
   a memory, which is configured to store at least one program;
   wherein the at least one program, when executed by the at least one processor, enables the at least one processor to perform:
      transmitting, to a wireless terminal, a higher layer signaling, wherein the higher layer signaling is configured to determine a first path-loss reference signal (RS) of at least one physical uplink shared channel (PUSCH) on a first component carrier, and
      receiving, from the wireless terminal, the at least one PUSCH on the first component carrier based on the first path-loss RS,
   wherein the first path-loss RS is determined according to a second path-loss RS which is associated with a sounding reference signal (SRS) associated with the at least one PUSCH, and
   wherein the at least one PUSCH is not configured with the first path-loss RS;
   wherein the first component carrier is configured with at least one control resource set (CORESET), and wherein the second path-loss RS associated with the SRS is determined based on: a RS of a transmission configuration indicator (TCI) state applied for a CORESET with a lowest index within the at least one CORESET or a Quasi co location (QCL) assumption for the CORESET with the lowest index within the at least one CORESET.

* * * * *